(12) United States Patent
Stommel

(10) Patent No.: US 7,878,760 B2
(45) Date of Patent: Feb. 1, 2011

(54) METHOD FOR OPERATING A WIND POWER PLANT

(75) Inventor: Matthias Stommel, Ganderkesee (DE)

(73) Assignee: Daubner & Stommel GbR Bau-Werk-Planung (DE)

( * ) Notice: Subject to any disclaimer, the term of this patent is extended or adjusted under 35 U.S.C. 154(b) by 862 days.

(21) Appl. No.: 11/738,770

(22) Filed: Apr. 23, 2007

(65) Prior Publication Data

US 2007/0253818 A1    Nov. 1, 2007

(51) Int. Cl.
*B63H 1/06* (2006.01)

(52) U.S. Cl. .............................. 416/1; 416/40; 416/61; 416/147; 416/132 B; 416/232

(58) Field of Classification Search ..................... 416/1, 416/40, 61, 147, 132 B, 232
See application file for complete search history.

(56) References Cited

U.S. PATENT DOCUMENTS

| | | | | | |
|---|---|---|---|---|---|
| 3,426,214 | A | * | 2/1969 | O'Malley | 290/55 |
| 4,464,579 | A | * | 8/1984 | Schwarz | 415/910 |
| 5,531,567 | A | | 7/1996 | Hulls | |
| 6,465,902 | B1 | * | 10/2002 | Beauchamp et al. | 416/155 |
| 6,769,873 | B2 | * | 8/2004 | Beauchamp et al. | 416/3 |
| 6,888,262 | B2 | * | 5/2005 | Blakemore | 416/61 |
| 7,360,996 | B2 | * | 4/2008 | Driver | 416/226 |
| 7,400,054 | B2 | * | 7/2008 | Wesselink | 416/1 |

2004/0067134 A1    4/2004  Beauchamp et al.

FOREIGN PATENT DOCUMENTS

| | | |
|---|---|---|
| CN | 1982697 A1 | 12/2006 |
| DE | 197 12 034 A1 | 9/1998 |
| DE | 198 60 215 C1 | 3/2000 |
| DE | 298 80 145 U1 | 4/2000 |
| DE | 295 22 190 U1 | 1/2001 |
| DE | 101 52 449 A1 | 5/2003 |
| DE | 102 02 995 A1 | 8/2003 |
| DE | 198 04 308 C2 | 10/2003 |
| DE | 102 19 664 A1 | 11/2003 |
| DE | 10 2005 016 524 A1 | 12/2005 |
| DE | 699 25 601 T2 | 4/2006 |
| WO | WO 02/073031 A1 | 9/2002 |

OTHER PUBLICATIONS

Chinese Office Action for application Chinese Application No. 200710105354.2 corresponding to priority application No. 102006020257 filed Apr. 27, 2006.
Canadian Office Action for Application No. 2,585,954 corresponding to this case.

\* cited by examiner

*Primary Examiner*—Igor Kershteyn
(74) *Attorney, Agent, or Firm*—Smith, Gambrell & Russell

(57) ABSTRACT

A method for operating a wind power plant, in which the wind power plant (10) has a multiplicity of components, but at least one rotor (18) with at least one rotor blade (22) and a generator for converting the mechanical energy of the rotor (18) into electrical energy and possibly a tower (14) on which the rotor (18) is arranged. Counterforces which counteract forces acting on the component (22), particularly wind loads, can be introduced into at least one component during the movement of rotation of the rotary blade (22).

34 Claims, 2 Drawing Sheets

METHOD FOR OPERATING A WIND POWER PLANT

STATEMENT OF RELATED APPLICATIONS

This patent application is based on and claims convention priority on German Patent Application No. 10 2006 020 257.0 having a filing date of 27 Apr. 2006, which is incorporated herein in its entirety by this reference.

BACKGROUND OF THE INVENTION

1. Technical Field

The present invention relates to a method for operating a wind power plant, wherein the wind power plant has a multiplicity of components but at least one rotor having at least one rotor blade and a generator for converting the mechanical energy of the rotor into electrical energy, wherein one or more characteristics are determined, particularly measured, which are directly or indirectly dependent on forces acting on the component and/or conversely depend on these forces acting on the component such as, for instance, the current wind speed or an operating parameter of the wind power plant, for instance the wind angle of attack of the rotor blade. The present invention also relates to a wind power plant for carrying out the method.

2. Related Art

Various components of a wind power plant are subject to different actions of force. These actions of force, in turn, lead to different problems. For example, the rotor blades of a wind power plant are exposed to a high wind load. The forces due to the wind load predominantly produce a deformation of the rotor blades. This deformation is usually greater at the wing tips than in the rotor blade sections closer to the rotor center.

Among other things, the blade deformation affects the angles of attack of the rotor blades with respect to the wind, set in each case. The actual angle of attack therefore frequently deviates from the predetermined angle of attack, particularly towards the blade tips. To counteract this, it is known in the prior art to prebend the rotor blades forward during its production, i.e. into the direction facing the wind with respect to the installed state. This predetermined prebending is a compromise, however, because it is only at a particular wind speed that the ratios of forces are such that the prebending in the production exactly compensates for the deformation caused by the wind pressure. When wind velocities deviate from this, the position of the rotor blade with respect to the wind is not optimal, therefore.

The forces influencing the individual components of the wind power plant such as, for example, the wind load, the respective inherent weight of the components or the like do not only lead to aerodynamic problems. In addition, these forces, particularly cyclic loads, also have a negative effect on the life of the individual components.

From US Patent Publication No. 2004/0067134 A1, it is known to twist rotor blades about their longitudinal axis in dependence on the wind speed measured, i.e. to partially turn or pitch the rotor blades out of the wind. For this purpose, piezoelectric fibres, the lengths of which can be controlled via a control device, are arranged within the walls of the rotor blade. As part of the solution of this document, the result is that the production of some forces having a negative influence on the rotor blade is already partially prevented in a relatively complicated manner in that the rotor blade is turned out of the wind in dependence on the intensity of the wind. The disadvantageous factor in this solution is, however, that naturally, it is not possible to prevent a multiplicity of forces acting on the rotor blade and having a negative influence on being produced. These forces which cannot be inhibited in advance by means of the partial pitching and which thus act on the rotor blade can continue to have a negative effect and damage the rotor blade in the context of the solution of US Patent Publication No. 2004/0067134 A1.

BRIEF SUMMARY OF THE INVENTION

It is the object of the present invention, therefore, to specify a method for operating a wind power plant by means of which at least some of the forces to which components of the wind power plant are exposed during operation and which already act on the component can be counteracted. It is also the object of the present invention to specify a wind power plant for carrying out such a method.

The object of the present invention is achieved by a method for operating a wind power plant, wherein the wind power plant has a multiplicity of components but at least one rotor having at least one rotor blade and a generator for converting the mechanical energy of the rotor into electrical energy, wherein one or more characteristics are determined, particularly measured, which are directly or indirectly dependent on forces acting on the component and/or conversely depend on these forces acting on the component such as, for instance, the current wind speed or an operating parameter of the wind power plant, for instance the wind angle of attack of the rotor blade, characterized in that during the movement of rotation of the rotor, counterforces counteracting the forces acting on the component, namely compensating for these at least temporarily at least partially or completely are introduced into the component in dependence on the characteristic determined or the characteristics determined. The object of the present invention also is achieved by a wind power plant, particularly for carrying out the above method, which has a multiplicity of components, at least one rotor with at least one rotor blade and a generator for converting the mechanical energy of the rotor into electrical energy, characterized by controllable force introduction means via which counterforces can be introduced into at least one component during the movement of rotation of the rotor blade, which counterforces counteract forces acting on the component, particularly wind loads, and namely compensate for these forces at least temporarily at least partially or completely.

Accordingly, one or more characteristics are determined, particularly measured, which are directly or indirectly dependent on forces influencing the component and/or on which, conversely, these forces influencing the component depend such as, for example, the current wind speed or one or more operating parameters of the wind power plant, for instance the wind angle of attack of the rotor blade, in a wind power plant which has a multiplicity of components, but at least a rotor having at least one rotor blade and a generator for converting the mechanical energy of the rotor into electrical energy, and possibly a tower on which the rotor is arranged. In dependence of the characteristics determined, counterforces are initiated via controllable force introduction means in at least one component during the movement of rotation of the rotor, which counterforces counteract the forces influencing the component, namely at least temporarily at least partially or completely compensate for these forces.

Controllable force introduction means are understood to be all technical means via which corresponding counterforces can be introduced into the components, wherein the force introduction should be controllable. In the simplest case of controllability, the force introduction can be switched on and off. When complex force introduction means are used, the most varied parameters of force introduction can be adjusted such as, for example, the intensity of the force introduction, its duration, its direction and/or the time or times of the force introduction or the like. This force introduction can be, in particular, continuous during the entire movement of rotation of the rotor but also at particular time intervals or at particular times, particularly periodically.

The characteristics are preferably determined or measured during the operation of the wind power plant, i.e. particularly during the movement of rotation of the rotor, continuously or at certain time intervals. The parameters of the counterforces to be introduced are adjusted in dependence on the values determined or measured. This makes it possible to optimally adapt the counterforces to the forces acting on the component.

With respect to the determination or measurement of the characteristics, the deformation forces currently occurring due to wind load, for example on the rotor blade of the wind power plant, can be measured by means of suitable sensors and the parameters of the counterforces can be adjusted in dependence thereon in one embodiment. Furthermore, the wind speed occurring at the rotor, at the rotor blade and/or in the rotor environment can be measured and the parameters of the counterforces to be introduced can be adjusted in dependence on these characteristics. In addition or as an alternative, the current operating parameters of the wind power plant, for instance the current wind angle of attack of the rotor blades, the frequency of rotation or speed of rotation of the rotor or the like can be determined and the parameters of the counterforces to be introduced can be adjusted in dependence on these values.

In a further preferred embodiment of the present invention, counterforces are introduced into the component, preferably into the rotor blade, by means of a controllable tensioning device arranged particularly on or in the component.

These counterforces preferably cause a pretension of the rotor blade in the direction facing the wind.

As is known by those of skill in the art, the controllable force introduction means, particularly the tensioning device, can be arranged in the most varied form. For example, a controllable pulling device with cables such as, for instance, wire cables, can also be conceivably used via which, for example, the rotor blade or other components can be controllably (pre-tensioned).

The tensioning device can generally have one or more pulling means, particularly pulling ropes, pulling cables, pulling chains, pulling straps or the like, preferably ropes of electroactive polymers, the pulling means preferably extending outside the walls of the component, particularly preferably in the interior of the component.

If the component is constructed as a rotor blade, the pulling means, particularly the pulling ropes, pulling cables, pulling chains, pulling straps or the like preferably extend in the interior of the rotor blade but outside the rotor blade walls, extending, with respect to the longitudinal extent of the rotor blade, at least in sections in the first rotor blade third, adjoining the blade connection, then conducted through second rotor blade thirds and extending at least section by section in the last rotor blade third adjoining the rotor blade tip. The decisive factor is that the pulling means are constructed in such a manner, and can be tensioned in such a manner that counterforces which counteract forces negatively acting on the rotor blade can be transferred to the rotor blade via the pulling means.

In the last rotor blade third adjoining the rotor blade tip, the pulling means are preferably connected to the rotor blade for introducing force, for instance attached directly to the wall of the rotor blade in the interior of the rotor blade. At their opposite end, the pulling means can be connected, in particular, to the rotor blade root or to the rotor hub for instance attached to walls of the rotor blade root or to the rotor hub. In particular, it is conceivable to wind up or unwind the pulling means controllably in the area of the first third of the rotor blade or, for example, directly on the rotor blade root or in the area of the rotor blade hub in motor-driven manner onto a roll or drum arranged there in order to produce the tension or tension relief, respectively, of the pulling means and thus the controllable force introduction into the rotor blade. Many types of embodiments are conceivable here.

The tensioning device can have electroactive polymer ropes, the lengths of which change when applying an electrical activation voltage. With a corresponding arrangement of these ropes in/on the component, particularly in/on the rotor blade, this change in length can be utilized for producing suitable deformations of the component which counteract wind-induced deformations or even completely compensate for these.

Accordingly, the introduction of the counterforces is controlled by means of the deformation or pretensioning of the component, particularly of the rotor blade, in such a manner that forces to which the component is exposed, for example due to wind load, can be effectively counteracted by a component deformation in the opposite direction.

In a further embodiment of the present invention, the force introduction into the or each rotor blade can be controlled periodically in such a manner that the pretension to which the rotor blade is subjected outside the tower pass is reduced when the rotor blade, particularly when pointing downwards, is located in the area of the tower pass, i.e. passes over the tower surface. Outside the tower area, the pretension of the rotor blade is then increased again to the respective initial value. Without this periodic reduction in the pretension in the tower area, there would be a risk that the pretension is greater than necessary due to the low wind load in the tower pass. Without reduction in pretension, the rotor blade would possibly move out of the usual plane of rotation into the area facing the wind during the tower pass which can lead to loading on the rotor blade and to aerodynamically unfavourable conditions.

According to a further aspect of the present invention, the counterforces are introduced into the component, particularly the rotor blade, in dependence on one or more parameters measured in spatial, at least horizontal distance from the rotor on the side of the wind power plant facing the wind, which describe the wind conditions in the measuring area, preferably the wind speed and/or the wind direction, the horizontal distance from the rotor in which the wind parameters are measured being selected in such a manner that the counterforce can be introduced before the wind forming the basis of the wind parameters, particularly a wind front or a wind gust, reaches the rotor.

During this process, at least one wind parameter can be measured at a vertical distance from the ground, the value of which lies in an interval between the point nearest to the ground and the point most distant from the ground of the area described by the rotor blade during one complete revolution. Furthermore, at least two wind parameters can be measured in the value interval of the vertical distance from the ground of the point nearest to the ground and the point most distant from the ground of the area described by the rotor blade during a complete revolution, the vertical distance of the points or areas from one another, in which the wind parameters are measured, being at least 50 cm, preferably at least 2 meters, particularly preferably at least 5 meters.

At least one wind parameter can be measured with reference to a front view of the side of the wind power plant facing the wind, within an imaginary annular area around the rotor hub, with an inside radius of the annular area which is greater than half the distance between the rotor hub and rotor blade tip and with an outside radius which is greater than ¾ of the distance between rotor hub and rotor blade tip, preferably equally large or greater than the whole distance between rotor hub and rotor blade tip.

The wind parameters can generally be measured with position and/or time resolution.

Furthermore, the wind speeds and/or wind directions in each case given at the measuring points can be measured at a multiplicity of measuring points spaced apart from one another, preferably with time resolution.

According to the invention, the introduction of the counterforces is preferably produced by means of controllably deformable materials. Apart from the aforementioned electroactive polymers, these can be all materials which can controllably perform dimension changes.

It is also within the scope of the invention to integrate at least partially materials—such as, for instance, electroactive polymers—which are controllably deformable, directly into the component walls themselves, for instance into the rotor blade shells. At least one layer of the component walls can consist at least partially of these materials. The component or the rotor blade can be covered, in particular, with these deformable materials.

The component or rotor blade deformation is preferably controlled by means of a controller via which suitable parameters of the force introduction means, for instance the tensioning device, are adjusted, such as, for instance, the activation voltage of the electroactive polymer ropes.

In a special embodiment of the present invention, counterforces which produce a pretension of the blade end, particularly in the direction of the rotor center, are introduced in the blade end of one or each rotor blade. Due to the inherent weight of the respective rotor blade, the blade end, which is frequently cast iron, of the rotor blade is subject to large cyclic loads which can be reduced by the pretension. Since the effect of the natural weight is greatest when the rotor blade, pointing downwards, is located in the area of the tower pass, i.e. passes over the tower surface, the pretension should be produced at least in the time interval in which the rotor blade is located in this area.

According to the invention, it can also be provided to introduce counterforces also in the tower of the wind power plant, which, for example, counteract tower vibrations or the like. For this purpose, it is conceivable to arrange a controllable tensioning device inside the tower in such a manner that the tower movements are correspondingly counteracted by the tensioning device. As in the case of the rotor blades, this can be achieved by electroactive polymer ropes arranged in a suitable manner. In a similar manner, counterforces can be introduced in the nacelle connection of a nacelle connected to the tower, by pretensioning the nacelle connection by means of the tensioning device which counterforces counteract the forces acting on the nacelle connection. In principle, it is conceivable to introduce counterforces in the manner described above into the most varied components of the wind power plant.

BRIEF DESCRIPTION OF THE DRAWINGS

Further features of the present invention are obtained from the attached claims, the subsequent description of a preferred illustrative embodiment and from the attached drawings, in which:

DETAILED DESCRIPTION OF PREFERRED EMBODIMENTS

Figure 1:
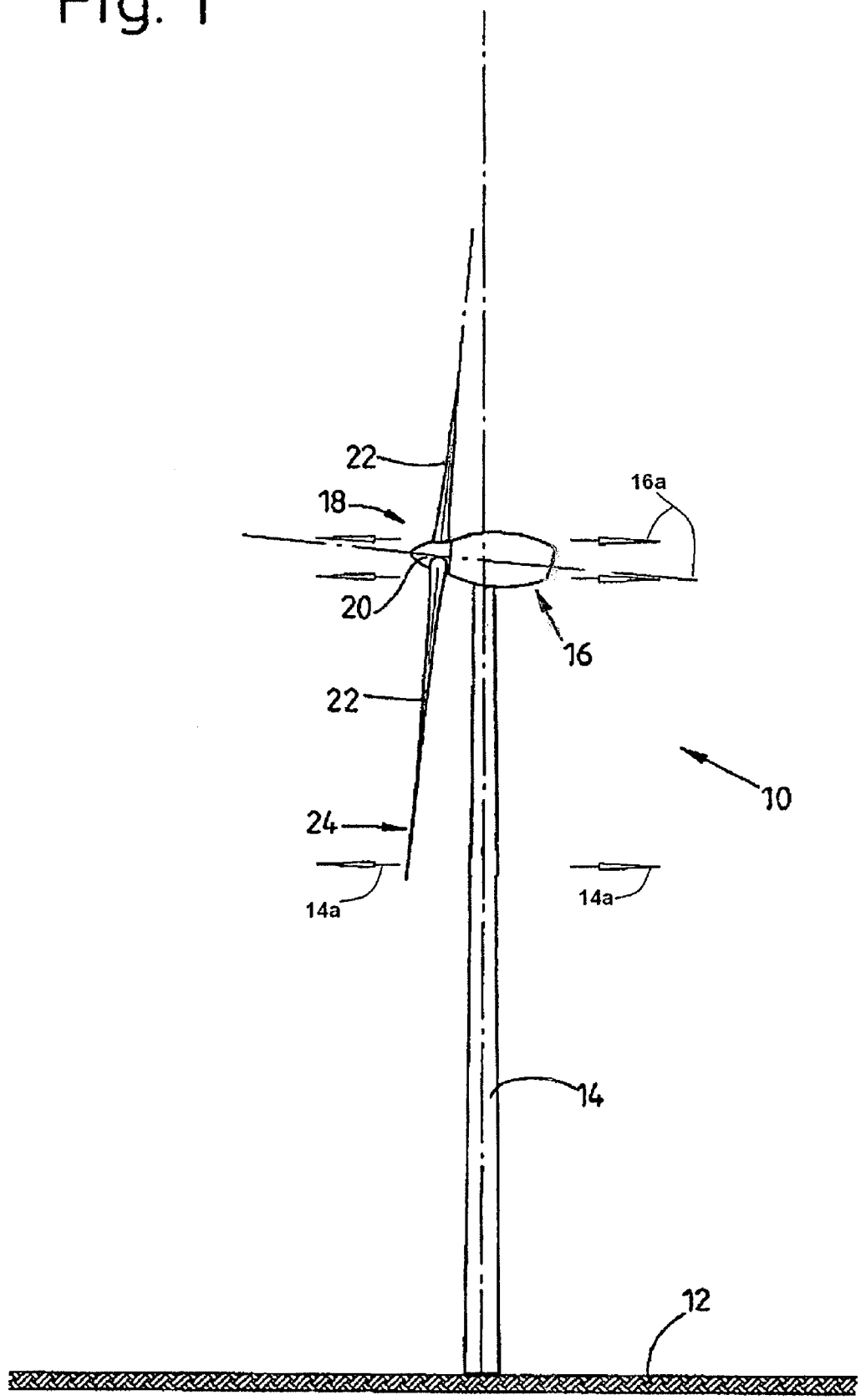
FIG. 1 shows a side view of a wind power plant according to the invention.

FIG. 1 shows a wind power plant 10 which has at the top end of a vertical tower 14 arranged on a horizontal underground 12 a nacelle 16 arranged on the tower top. As is known to those of skill in the prior art, many types of embodiments are conceivable for the precise arrangement of a tower of a wind power plant. Naturally, the invention is not restricted to the truncated cone-shaped form of the tower 14 described in the drawing.

At one end of the nacelle 16 facing the wind, a rotor 18 is arranged which has a hub 20. Three rotor blades 22 are connected to the hub 20, the rotor blade roots of the rotor blades 22 being inserted into corresponding openings in the hub 20 and connected to the latter in familiar manner.

The rotor 18 rotates about an axis slightly inclined to the top with respect to the horizontal. As soon as wind impinges on the rotor blades 22, the rotor 18 and its rotor blades 22 are placed into rotation about the rotor shaft. The movement of the rotor shaft is converted into electrical current by a generator arranged inside the nacelle. During the rotation, the rotor blades 22 pass over a circular area. The position of the rotor blades 22 can be individually changed with respect to the wind via an adjusting device, not shown but known to the experts in the prior art, that is to say the angle of attack of the rotor blades 22 with respect to the wind is adjustable.

The principal structure of the wind power plant 10 with rotor shaft arranged at least approximately horizontally is known in the prior art so that a detailed description of it is omitted.

In operation, the rotor blades 22 are deformed in the direction of the side facing away from the wind during the movement of rotation of the rotor 18 due to the wind pressure. This wind-induced deformation is compensated for only partially in the prior art in that the respective rotor blade tip 24 is already slightly prebent during production in the direction of the side facing the wind. This prebending during production leads to adequate results only at certain reference speeds. In contrast, the respective position of the rotor blade 22 with respect to the wind is inadequate despite prebending due to the wind-induced deformation at least at speeds which clearly deviate from this reference speed.

For this reason, according to the invention, counterforces to the forces produced by the wind pressure, which are directed oppositely to the wind-induced forces currently acting and at least approximately compensate but at least reduce these are introduced into each rotor blade 22 during the operation of the wind power plant.

These counterforces 24a are introduced into each rotor blade 22 by means of controllable force introduction means.

Figure 2:
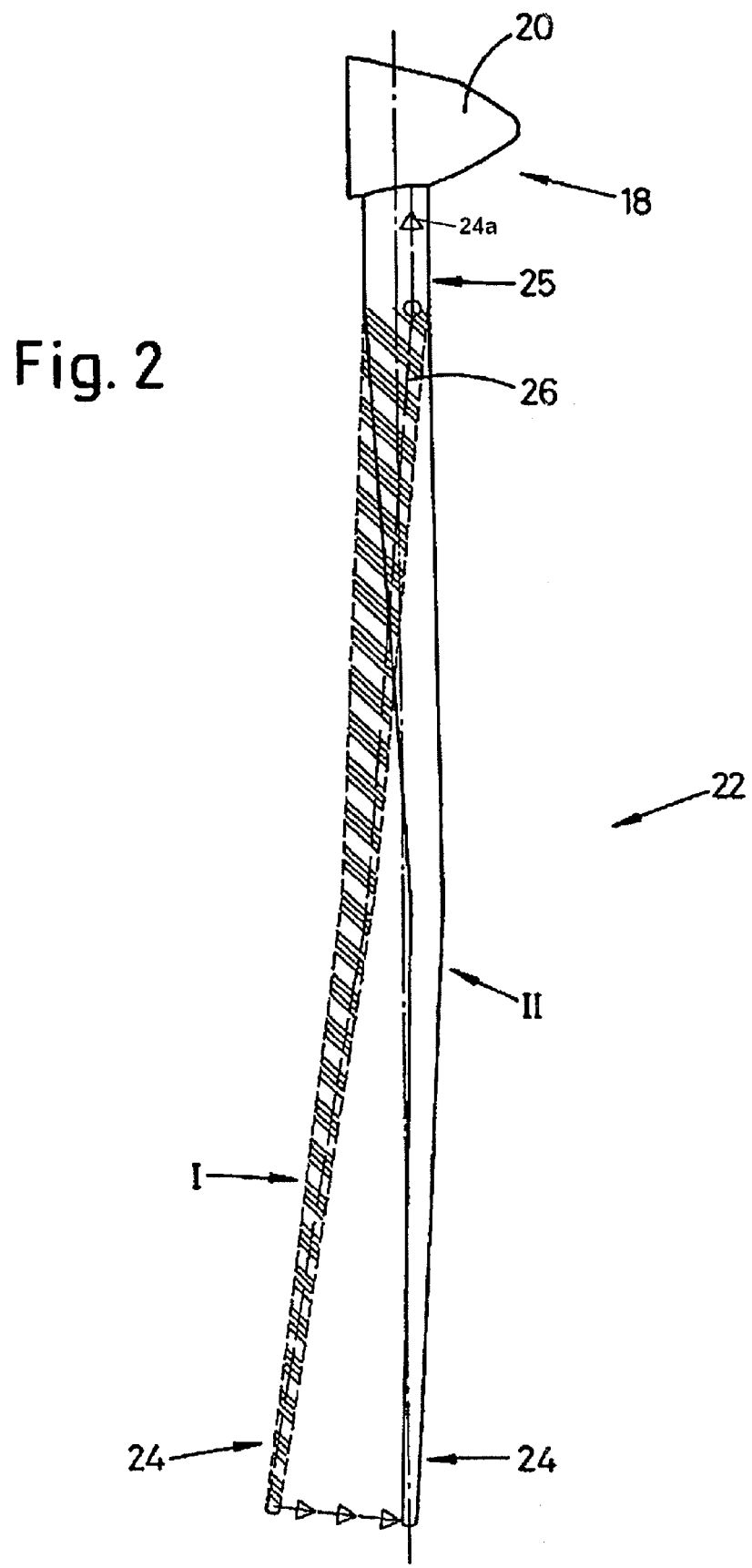
FIG. 2 shows a longitudinal section through a rotor blade according to the invention, with a force introduction means which has an electroactive polymer rope.

Each controllable force introduction means of each rotor blade 22 in each case comprises a controllable tensioning device 25 by means of which the rotor blade 22 can be pretensioned against the wind direction, compare FIG. 2. The tensioning device 25 has at least one rope of electroactive polymer 26 or of materials in which the electroactive polymers are at least partially integrated.

Each electroactive polymer rope 26 is attached to the respective rotor blade 22 in the area of the rotor blade tip 24, i.e. in the last third of the rotor blade, looking in the longitudinal direction from the blade root. The rope 26 is conducted inside the rotor blade 22 from this last rotor blade third via the second rotor blade third to the first rotor blade third adjoining the rotor blade root. The other end of the polymer rope 26 is finally attached at a suitable position, particularly at the rotor hub 22, at the end of the rotor blade 22 opposite to the rotor blade tip 24. By activating the electroactive polymer rope 26, each rotor blade 22 can be changed from a first position I without pretension into a second, pretensioned position II. In the second position II, the respective rotor blade 22 is pretensioned into the direction facing the wind.

The electroactive polymer rope 26 is activated by applying a suitable electrical voltage and has the effect that the rope 26 is reduced in length. Without counterforces to be compensated, the reduction in length of the polymer rope would lead to turning the rotor blade 22 from position I into position II.

The electroactive polymer rope 26, and thus the pretension of each rotor blade 22, can be controlled by adjusting suitable parameters via a control device, not shown. The magnitude of the reduction in length of the electroactive polymer rope 26, and thus the amplitude of the pretension, which counteracts the wind-induced deformation of the rotor blade 22, can be adjusted for instance by adjusting the amount of the electrical voltage applied. Lastly, the amounts and the directions of the force components which point in the direction facing the wind and thus counteract the wind-induced forces are adjusted in this manner.

The current wind speed is in each case measured by suitable sensors. The counterforce introduction represented above is then controlled in dependence on this characteristic. At high wind speeds, and thus a large wind load, each rotor blade 22 is pretensioned to a corresponding extent in the direction facing the wind. At lesser wind speeds, the rotor blades 22 are pretensioned to a lesser extent.

The introduction of the counterforce 24a, and thus the pretensioning of each rotor blade 22, can be controlled in such a manner that an optimum pretension matching each wind load or wind speed is given. According to the invention, it can also be provided to introduce counterforces 14a also in the tower of the wind power plant, which, for example, counteract tower vibrations or the like. For this purpose, it is conceivable to arrange a controllable tensioning device inside the tower in such a manner that the tower movements are correspondingly counteracted by the tensioning device. As in the case of the rotor blades, this can be achieved by electroactive polymer ropes arranged in a suitable manner. In a similar manner, counterforces 16a can be introduced in the nacelle connection of a nacelle connected to the tower, by pretensioning the nacelle connection by means of the tensioning device which counterforces counteract the forces acting on the nacelle connection. In principle, it is conceivable to introduce counterforces in the manner described above into the most varied components of the wind power plant.

LIST OF REFERENCE DESIGNATIONS

10 Wind power plant
12 Underground
14 Tower
16 Nacelle
18 Rotor
20 Hub
22 Rotor blade
24 Rotor blade tip
25 Tensioning device
26 Electroactive polymer rope

What is claimed is:

1. Method for operating a wind power plant, wherein the wind power plant (10) has at least one rotor (18) having at least one rotor blade (22) and a generator for converting the mechanical energy of the rotor (18) into electrical energy, comprising the steps of:
   determining or measuring at least one characteristic that is directly or indirectly dependent on forces acting on the at least one rotor blade (22) and/or conversely depend on these forces acting on the rotor blade,
   during the movement of rotation of the rotor (18), counterforces counteracting the forces acting on the rotor blade are introduced into the at least one rotor blade (22) in dependence on respective the at least one characteristic determined or measured,
   counterforces are introduced into the at least one rotor blade (22) that produce a pretension of the at least one rotor blade (22), and
   the introduction of the counterforces into the or each of the at least one rotor blade (22) is controlled periodically in such a manner that the pretension with which the at least one rotor blade (22) is loaded outside its tower pass is reduced when the at least one rotor blade is in the area of the tower pass in the course of the movement of rotation.

2. Method according to claim 1, characterized in that the counterforces partially or completely compensating for the forces acting on the at least one rotor blade (22) are introduced by means of a controllable tensioning device.

3. Method according to claim 1, characterized in that parameters of the counterforces to be introduced are adjusted in dependence on the at least one characteristic determined or measured during movement of rotation of the rotor (18).

4. Method according to claim 1, characterized in that during movement of rotation of the rotor (18), the counterforces counteract movements or deformations of the at least one rotor blade (22) resulting from wind load related forces are introduced at least into one of the at least one rotor blade (22).

5. Method according to claim 4, characterized in that the wind load related forces are measured directly in or on the at least one rotor blade (22), and in that the parameters of the counterforces are adjusted in dependence on the measured values.

6. Method according to claim 1, characterized in that the counterforces that produce a pretension of a blade connection do so in the direction of the rotor center, and are introduced into the blade connection of one or each of the at least one rotor blade (22).

7. Method according to claim 1, characterized in that the counterforces that produce a pretension of a blade connection do so at least in a time interval in which the rotor blade (22) is in the area of tower pass in the course of movement of rotation.

8. Method according to claim 1, characterized in that counterforces which counteract tower vibrations are introduced into a tower (14).

9. Method according to claim 1, characterized in that counterforces which counteract vibrations of a nacelle (16) connected to the tower (14) are introduced into a nacelle connection.

10. Method according to claim 1, characterized in that the counterforces are introduced into the at least one rotor blade (22) in dependence on at least one parameter measured at spatial at least horizontal distance from the rotor (16) on a side of the wind power plant (10) facing the wind, the horizontal distance from the rotor in which the wind parameters are measured being selected in such a manner that the counterforce can be introduced before the wind forming the basis of the wind parameters reaches the rotor (16).

11. Method according to claim 10, characterized in that the wind parameters are measured in an area which is arranged on the side of the wind power plant (10) facing the wind with reference to a main wind flow to be expected.

12. Method according to claim 10, characterized in that at least one wind parameter is measured at a horizontal distance of at least 1 meter from the rotor (16).

13. Method according to claim 1, wherein the forces acting on the rotor blade are selected from the group consisting of current wind speed and operating parameters of the wind power plant.

14. Method according to claim 1, wherein during the movement of rotation of the rotor (18), the counterforces counteracting the forces acting on the rotor blade compensate for these at least temporarily at least partially or completely.

15. Method according to claim 3, wherein the parameters of the counterforces to be introduced are selected from the group consisting of the intensity, duration, direction and/or the time or times of force introduction.

16. Method according to claim 4, characterized in that during movement of rotation of the rotor (18), the counterforces counteract movements or deformations of the at least one rotor blade (22) resulting from wind load related forces are introduced into each of the at least one rotor blade (22).

17. Method according to claim 1, characterized in that counterforces are introduced into the at least one rotor blade (22) that produce a pretension of each of the at least one rotor blade (22).

18. Method according to claim 17, characterized in that counterforces are introduced into the at least one rotor blade (22) that produce a pretension of each of the at least one rotor blade (22) in the direction facing the wind.

19. Method according to claim 1, characterized in that the introduction of the counterforces into the or each of the at least one rotor blade (22) is controlled periodically in such a manner that the pretension with which the at least one rotor blade (22) is loaded outside its tower pass is reduced when the at least one rotor blade is in the area of the tower pass in the course of the movement of rotation and is pointing downwards.

20. Method according to claim 10, characterized in that the counterforces describe wind conditions in the measuring area.

21. Method according to claim 10, characterized in that at least one wind parameter is measured at a horizontal distance of at least 10 meters from the rotor (16).

22. Method according to claim 10, characterized in that at least one wind parameter is measured at a horizontal distance of at least 20 meters from the rotor (16).

23. Method according to claim 11, characterized in that at least one wind parameter is measured at a horizontal distance of at least 1 meter from the rotor (16).

24. Method according to claim 11, characterized in that at least one wind parameter is measured at a horizontal distance of at least 10 meters from the rotor (16).

25. Method according to claim 11, characterized in that at least one wind parameter is measured at a horizontal distance of at least 20 meters from the rotor (16).

26. A wind power plant comprising at least one rotor (18) having at least one rotor blade (22) and a generator for converting the mechanical energy of the rotor (18) into electrical energy, wherein the mechanical energy of the rotor (18) is converted into electrical energy, and wherein:
  at least one characteristic that is directly or indirectly dependent on forces acting on the at least one rotor blade (22) and/or conversely depend on these forces acting on the rotor blade can be determined or measured;
  counterforces counteracting the forces acting on the rotor blade into the at least one rotor blade during the movement of rotation of the rotor (18), in dependence on respective the at least one characteristic determined or measured can be introduced;
  counterforces into the at least one rotor blade (22) that produce a pretension of the at least one rotor blade (22) can be introduced, and
  the introduction of the counterforces into the or each of the at least one rotor blade (22) in such a manner that the pretension with which the at least one rotor blade (22) is loaded outside its tower pass is reduced when the at least one rotor blade is in the area of the tower pass in the course of the movement of rotation can be controlled periodically.

27. Wind power plant according to claim 26, characterized in that the controllable force introduction means comprise a controllable tensioning device (25) via which the at least one rotor blade (22) can be loaded with a mechanical pretension.

28. Wind power plant according to claim 27, characterized in that the tensioning device (25) has at least one pulling means, wherein the pulling means extend outside the walls of the at least one rotor blade (22) from the interior of the at least one rotor blade (22).

29. Wind power plant according to claim 28, characterized in that the pulling means extend in the interior of the at least one rotor blade but outside the rotor blade walls wherein they extend, with reference to the longitudinal extent of the rotor blade, at least section by section in the first rotor blade third adjoining the blade connection, are guided through the second rotor blade third and extend at least section by section in the last rotor blade third adjoining the rotor blade tip.

30. Wind power plant according to claim 29, characterized in that the pulling means are connected to the rotor blade in the last rotor blade third adjoining the rotor blade tip with reference to the longitudinal extent of the rotor blade, for the purpose of force introduction.

31. Wind power plant according to claim 26, characterized in that a pulling means is an electroactive polymers constructed in such a manner that the rotor blade (22), by means of their actuation, can be loaded with a pretension in the direction facing the wind.

32. Wind power plant according to claim 28, characterized by a control and/or regulating device via which the pulling means can be controlled and/or regulated.

33. Wind power plant according to claim 26, characterized by sensors via which the forces acting on the at least one rotor (22) can be measured.

34. Wind power plant according to claim 28, characterized in that the at least one pulling means is selected from the group consisting of pulling ropes, pulling cables, pulling chains, pulling straps, and ropes of electroactive polymers (26).

* * * * *